United States Patent [19]

Yamazaki

[11] Patent Number: 5,563,851
[45] Date of Patent: Oct. 8, 1996

[54] MAGNETO-OPTICAL RECORDING APPARATUS CAPABLE OF REPRODUCING RECORDING INFORMATION WHILE RECORDING

[75] Inventor: Katuya Yamazaki, Yokohama, Japan

[73] Assignee: Canon Kabushiki Kaisha, Tokyo, Japan

[21] Appl. No.: 973,757

[22] Filed: Nov. 9, 1992

[30] Foreign Application Priority Data

Nov. 19, 1991 [JP] Japan .................... 3-329824

[51] Int. Cl.⁶ .................................................. G11B 11/12
[52] U.S. Cl. ................... 369/13; 369/54; 369/58
[58] Field of Search ................. 369/13, 14, 54, 369/58, 59, 47, 48, 124, 32, 100, 109, 110, 121, 275.2, 283; 360/59, 114, 72.1, 72.2; 365/122

[56] References Cited

U.S. PATENT DOCUMENTS

| | | | |
|---|---|---|---|
| 4,879,703 | 11/1989 | Kaku et al. | 369/13 |
| 5,224,068 | 6/1993 | Miyake et al. | 365/122 |
| 5,233,578 | 8/1993 | Yamamoto et al. | 369/13 |

FOREIGN PATENT DOCUMENTS

| | | |
|---|---|---|
| 0276808 | 8/1988 | European Pat. Off. . |
| 0309232 | 3/1989 | European Pat. Off. . |
| 0429221 | 5/1991 | European Pat. Off. . |
| 0437308 | 7/1991 | European Pat. Off. . |
| 0523944 | 1/1993 | European Pat. Off. . |
| 5-20720 | 1/1993 | Japan . |

OTHER PUBLICATIONS

Patent Abstracts of Japan, Kokai No. 61–276149, vol. 11, No. 137, 5/1987.
Patent Abstracts of Japan, Kokai No. 03–073448, vol. 15, No. 237, 6/1991.

*Primary Examiner*—Ali Neyzari
*Attorney, Agent, or Firm*—Fitzpatrick, Cella, Harper & Scinto

[57] ABSTRACT

A magneto-optical recording apparatus records information in a magneto-optical recording medium with a light beam and an external magnetic field. The magneto-optical recording apparatus includes a light beam radiating device for radiating a light beam to the recording medium, an external magnetic field applying device for applying an external magnetic field modulated depending upon recording information to a portion thus radiated by the light beam, and an information reproducing device for reproducing the information recorded in the recording medium by detecting reflection light of the light beam from the medium, then to output a reproduction signal. The magneto-optical recording apparatus further includes either a detecting device for detecting whether a level of the reproduction signal is in an increase trend or in a decrease trend or a comparing device for comparing a level of the reproduction signal with a first reference value and with a second reference value. A judging device judges whether the information is correctly recorded based either on a detection result of the detecting device and a direction of the magnetic field or on a comparison result of the comparing device and the recording information.

6 Claims, 9 Drawing Sheets

MAGNETO-OPTICAL RECORDING APPARATUS CAPABLE OF REPRODUCING RECORDING INFORMATION WHILE RECORDING

BACKGROUND OF THE INVENTION

1. Field of the Invention

The present invention relates to a magneto-optical recording apparatus enabling so-called one beam direct verification, in which erasing, recording, and verifying of information may be conducted with a single light beam in a single process.

2. Related Background Art

Recently, one beam direct verification has been studied to simultaneously check whether information is correctly recorded in recording of information with a single light beam, in order to increase a recording speed and to simplify a construction of the apparatus. For example, such verification is described in Japanese Patent Application No. 3-175159, and proposed is a magneto-optical recording method in which a magneto-optical recording medium is of a double layer structure, information is recorded by a magnetic field modulation method, and a reflection light (or Kerr rotation angle) of a light beam for recording is identified while recording the information to conduct the verification of the recording information. The magneto-optical recording method may enjoy such advantages as an increase in recording speed and simplification of construction of the apparatus without necessity of complex position adjustment of the light beam.

In the above-described conventional example, there is, however, a deviation caused between a region to which a recording laser beam is radiated (as will be referred to as a light spot) and a region in which a coercive force of a recording medium is lessened, so that there may exist in the light spot area a region where the coercive force of the recording medium is lessened (a region which has reached a Curie temperature of the medium) and a region where the coercive force of the recording medium is sufficiently high (a region which has not yet reached the Curie temperature). Thus, old information as recorded before exists in the region which has not reached the Curie temperature of the recording medium. On the other hand, new information under current recording is provided in the region which has reached the Curie temperature of the recording medium. Therefore, there are the old information and the new information mixed in the light spot. Then, when the reproduction is performed by using the reflection light (or Kerr rotation angle) of the recording laser beam, the new information is read out including the old information component. As the old information component increases in the reproduction signal, such a problem becomes outstanding that quality of a signal for verification is degraded due to cross talk of the old information.

SUMMARY OF THE INVENTION

The present invention has been accomplished in order to solve such a problem. It is an object of the present invention to provide a magneto-optical recording apparatus capable of accurately conducting the one beam direct verification irrespective of cross talk of an old information component contained in a reproduction signal.

The object of the present invention may be achieved by a magneto-optical recording apparatus provided with means for radiating a light beam to a magneto-optical recording medium and means for applying a magnetic field modulated depending upon recording information to a portion radiated by the light beam, in which information is recorded in the recording medium with a mutual action of the radiation of the light beam and of the application of the magnetic field, characterized by provision of means for reproducing the information being currently recorded from reflection light of the recording light beam while recording, means for detecting whether a level of the reproduction signal obtained is in an increase trend or in a decrease trend, and means for judging whether the information is correctly recorded based on the detection result and a direction of the magnetic field of the magnetic field applying means, to conduct the verification.

Also, the object of the present invention may be achieved by a magneto-optical recording apparatus provided with means for radiating a light beam to a magneto-optical recording medium and means for applying a magnetic field modulated depending upon recording information to a portion radiated by the light beam, in which information is recorded in the recording medium with a mutual action of the radiation of the light beam and of the application of the magnetic field, characterized by provision of means for reproducing the information being currently recorded from reflection light of the recording light beam while recording, means for comparing a level of the reproduction signal obtained with a first reference value and with a second reference value, respectively, and means for judging whether the information is correctly recorded based on the comparison result and the recording information, to conduct the verification.

BRIEF DESCRIPTION OF THE DRAWINGS

FIGS. 6 (a–m) is explanatory drawing to show a recording process of information in the embodiment of FIG. 1;

FIG. 7 (a–m) is explanatory drawing to show a recording process of information in the embodiment of FIG. 1;

DETAILED DESCRIPTION OF THE PREFERRED EMBODIMENTS

Figure 1:
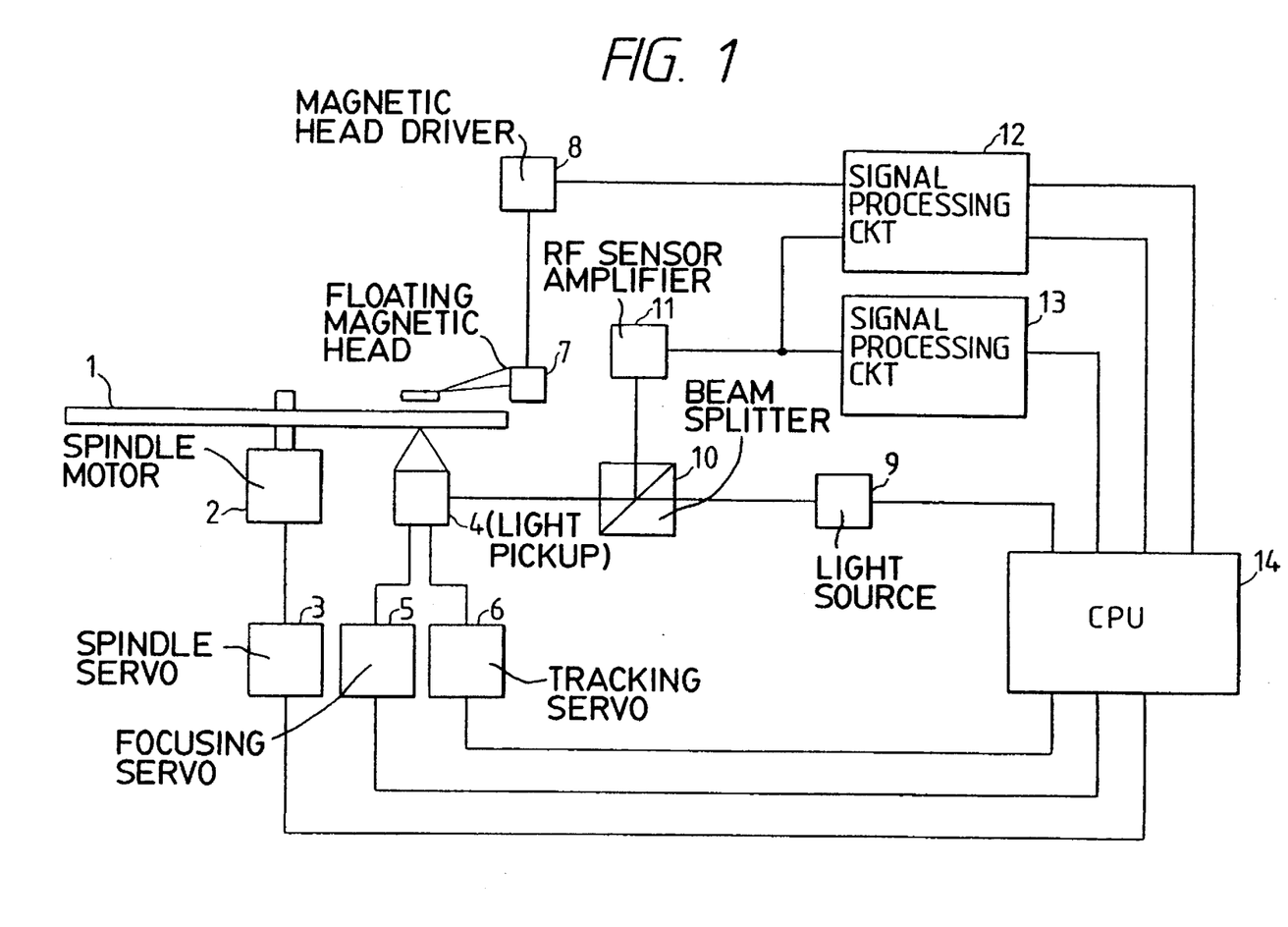
FIG. 1 is a constitutional drawing to show an embodiment of a magneto-optical recording apparatus according to the present invention.

Embodiments of the present invention will be explained in detail in the following with reference to the accompanying drawings. FIG. 1 is a constitutional drawing to show an embodiment of a magneto-optical recording apparatus according to the present invention. In FIG. 1, reference numeral 1 designates a magneto-optical recording medium such as a magneto-optical disk to conduct recording and reproducing of information. A specific construction and properties of the recording medium will be detailed later. Numeral 2 denotes a spindle motor for rotating the recording medium 1; 3 a spindle servo for controlling the spindle motor 2 to rotate the spindle motor 2 at a constant speed; 4 a light pickup for converging an optical flux from a light source 9 onto the recording medium 1; 5 a focusing servo for controlling the device to prevent focus offset of a light beam of the light pickup 4 relative to a medium surface of the recording medium 1; 6 a tracking servo for controlling the device to prevent offset of the light beam of the light pickup 4 relative to an information track on the recording medium 1; 7 a floating magnetic head for generating a magnetic field modulated depending upon information to be recorded; and 8 a magnetic head driver for driving the floating magnetic head 7. Numeral 9 designates a light source provided with a semiconductor laser as a light source and a drive circuit for turning on and off tile semiconductor laser; 10 a polarized light beam splitter for separating light returning from the optical pickup 4 (reflection light from the recording medium) from light advancing from the light source 9 to the light pickup 4; 11 an RF sensor amplifier for receiving the light returning from the light pickup 4 after being separated by the polarized light beam splitter 10 to reproduce the information recorded on the recording medium 1 as an electric signal; and 12 a signal processing circuit for detecting whether the information is correctly recorded based on the reproduction signal reproduced by the RF sensor amplifier 11 and on the recording information given to the floating magnetic head 7. Details will be later explained as to a specific construction and operation of the signal processing circuit 12. Numeral 13 denotes a signal processing circuit for binarizing the reproduction signal reproduced by the RF sensor amplifier 11, and numeral 14 a CPU for totally controlling the spindle servo 3, the focusing servo 5, the tracking servo 6, the light source 9, the signal processing circuit 12, the signal processing circuit 13, and others as explained above.

Figure 2:
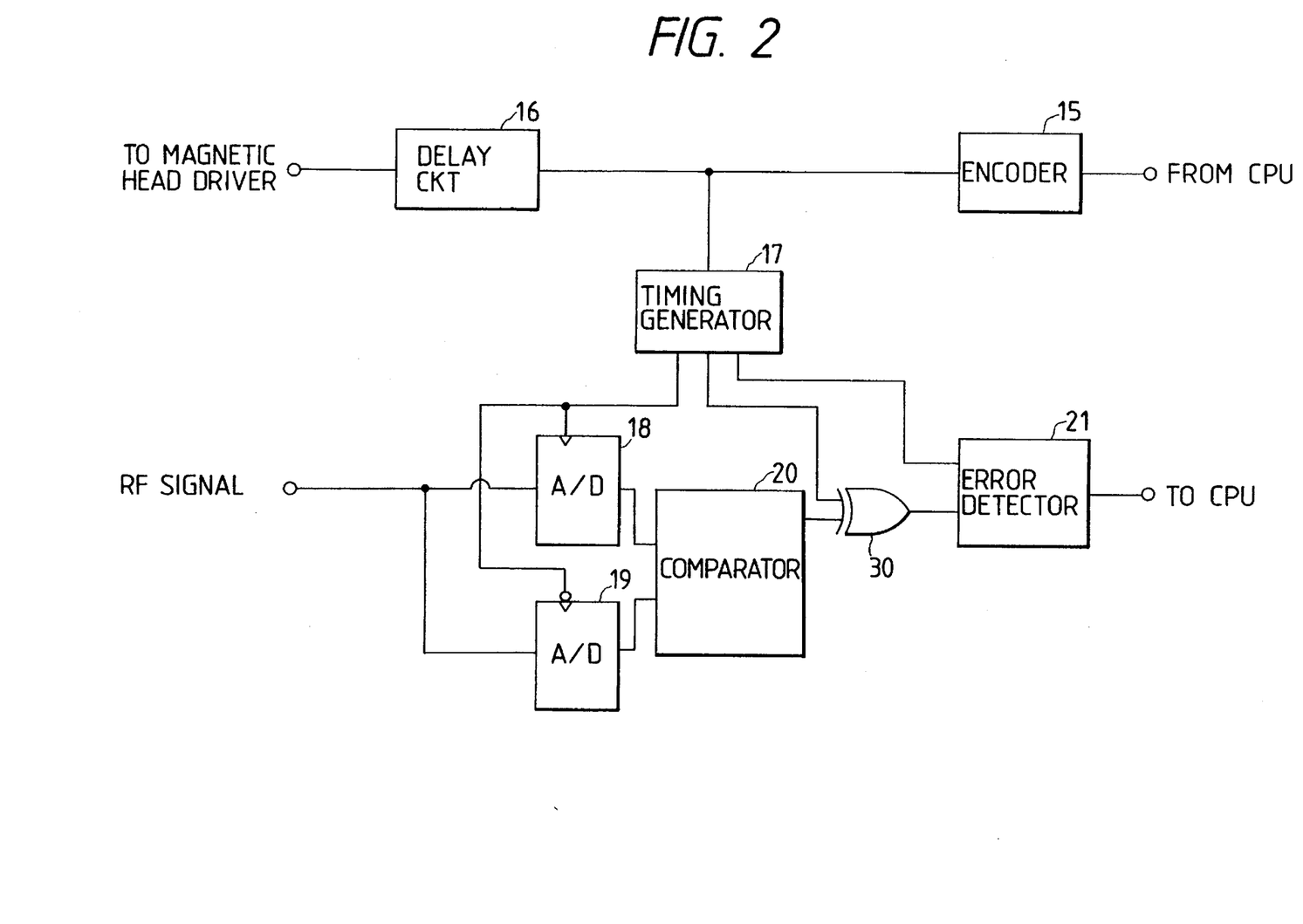
FIG. 2 is a block diagram to show a specific example of a signal processing circuit to conduct verification in the embodiment of FIG. 1.

FIG. 2 is a circuit diagram to show a particular circuit example of the signal processing circuit 12 as shown in FIG. 1. In FIG. 2, reference numeral 15 denotes an encoder for modulating a recording signal sent from the CPU 14 to convert it into recording information suitable for recording in the recording medium 1; 16 a delay circuit for delaying the recording information produced by the encoder 15 for a constant time; and 17 a timing generator for producing a timing signal for reading a production signal (as will be referred to as an RF signal) from the RF sensor amplifier 11, as later described in detail, based on the recording information produced by the encoder 15. Numeral 18 represents a first A/D converter for performing an A/D conversion of the RF signal with a signal of the timing generator 17 and holding a content thereof for a certain time; 19 a second A/D converter for performing an A/D conversion of the RF signal with a signal of the timing generator and holding a content thereof for a certain time; 20 a comparator for successively comparing the content held by the A/D converter 18 with the content held by the A/D converter 19; and 21 an error detector for judging whether the recording information thus recorded is correctly recorded on the recording medium 1 with outputs of the comparator 20 and of the timing generator 17.

Figure 3:
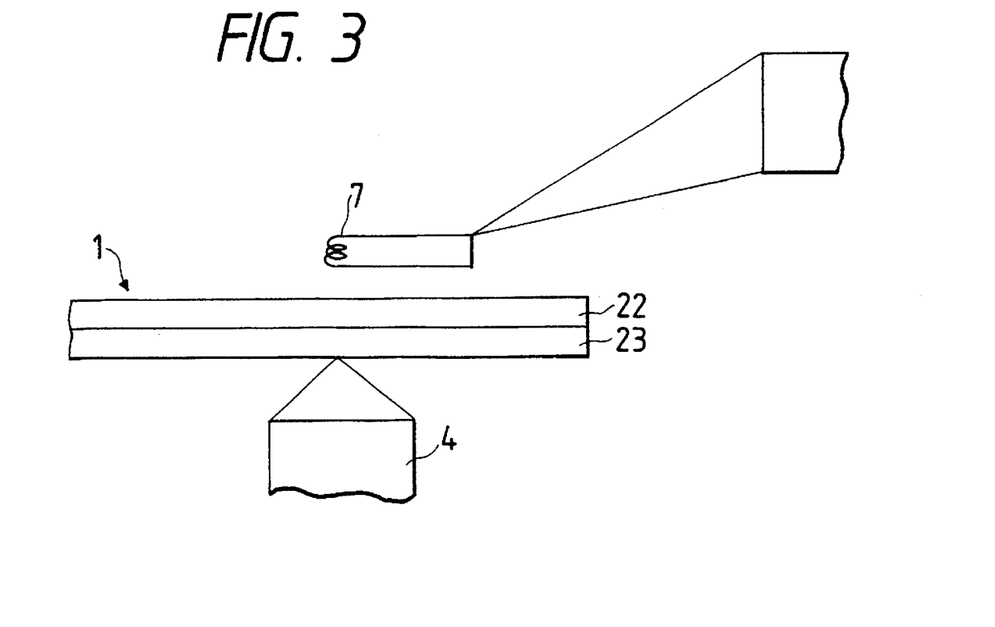
FIG. 3 is an explanatory drawing to show a layered structure of the magneto-optical recording medium.
Figure 4:
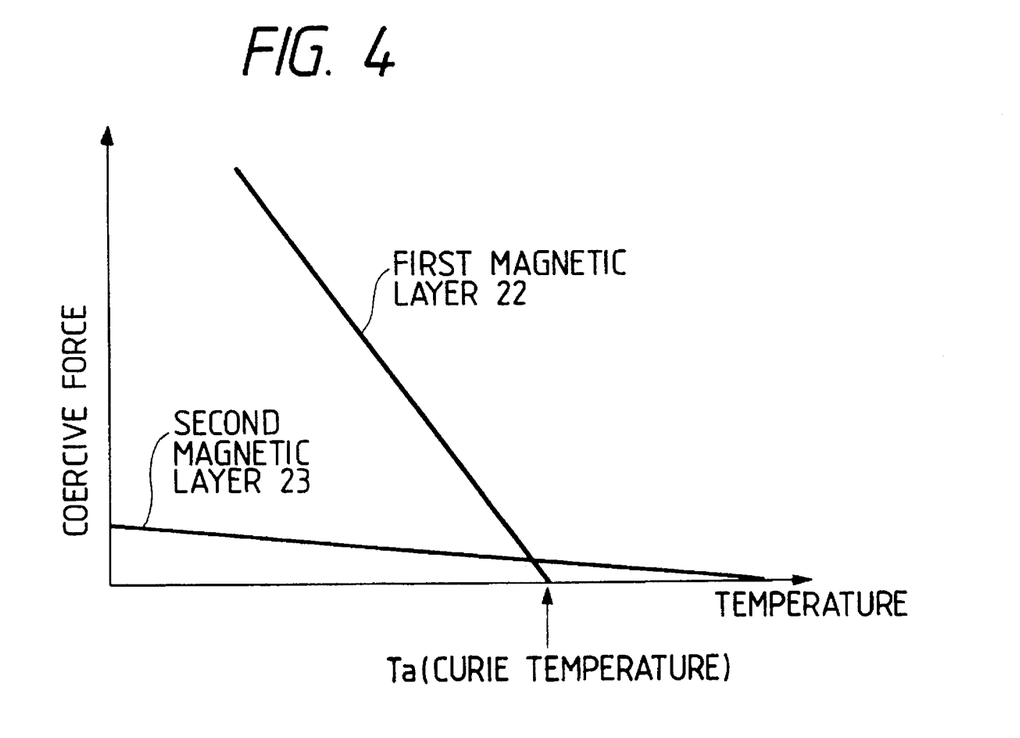
FIG. 4 is a characteristic diagram to show a relation between a temperature and a coercive force in a first recording layer and a second recording layer of the magneto-optical recording medium.

FIG. 3 is a drawing to show a specific construction of the magneto-optical recording medium 1 as shown in FIG. 1. In FIG. 3, numeral 22 denotes a first recording layer for storing information as a direction of magnetization by a magnetic field generated by the floating magnetic head 7 and by an optical flux converged by the light pickup 4. Further, numeral 23 denotes a second recording layer for similarly storing information as a direction of magnetization with a mutual action of the light beam and the magnetic field and for causing the Kerr effect on the light beam radiated from the light pickup 4 based on the magnetization direction in the portion radiated by the light beam. FIG. 4 shows a relation between temperature and a coercive force in the first and the second recording layers 22, 23, in which the first recording layer 22 has a lower Curie temperature than the second recording layer 23 and the second recording layer 23 has a lower coercive force than the first recording layer 22. The first and the second recording layers 22, 23 are structured such that respective magnetizations thereof are coupled by an exchange coupling force.

Figure 5A:
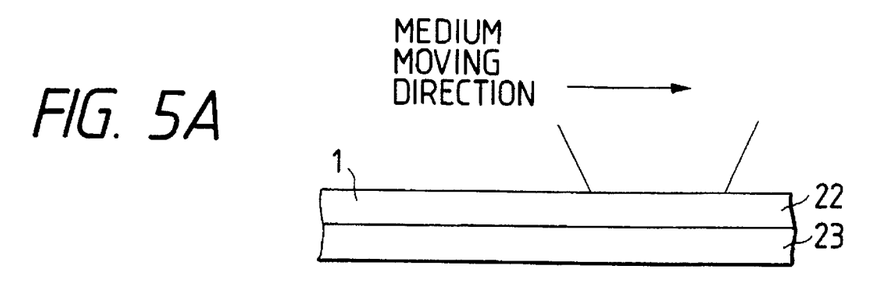
FIGS. 5A to 5C are drawings to explain a principle of the present invention.
Figure 5B:
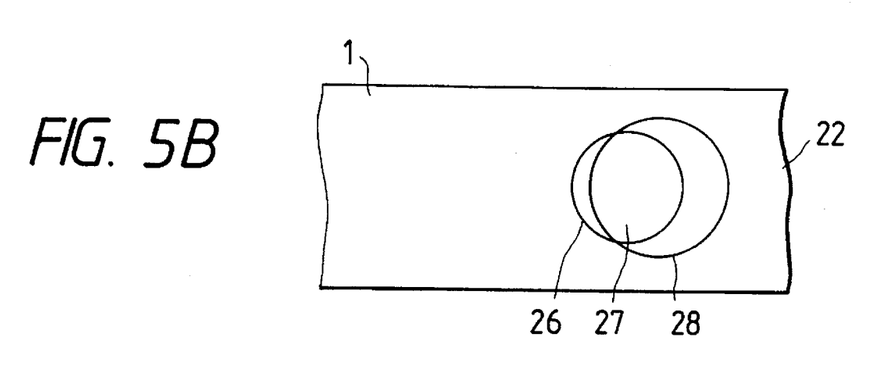
Figure 5C:
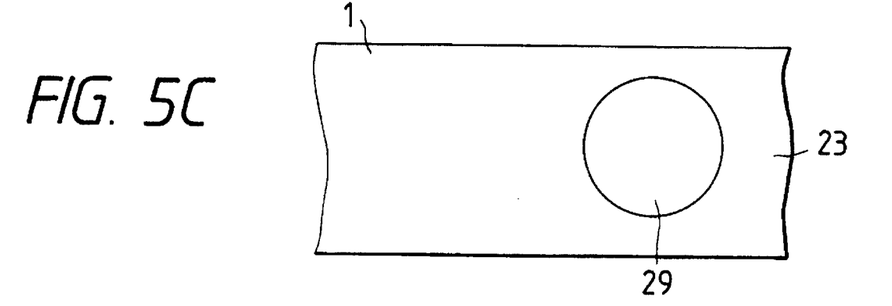

Next, simply explained with reference to FIGS. 5A through 5C is a reason why the information presently recorded can be reproduced as a verification signal, which is a fundamental principle of the present embodiment: In FIGS. 5A through 5C, let the light beam converged by the light pickup 4 move from the left to the right on the recording medium 1 as shown by an arrow in the drawing. Then, a relation between the light spot on the recording medium 1 and the Curie temperature of the recording medium 1 is as shown in FIG. 5B and FIG. 5C. In detail, an area represented by numeral 26 is one exceeding the Curie temperature of the recording medium 1 by the light beam converged by the light pickup 4 and a heat accumulation effect of the recording medium 1. Using the first and the second recording layers 22, 23 having the properties for the recording medium 1 as described above, and setting an intensity of the light beam converged by the light pickup 4 at an appropriate intensity, the area 26 would appear only in the first recording layer 22. An area represented by numeral 27 is also one exceeding the Curie temperature of the first recording layer 22 and located within the light spot. Further, an area represented by numeral 28 is one located within the light spot but having the first recording layer 22 not reaching the Curie temperature thereof, and an area represented by numeral 29 is one for reading the information in the recording medium 1 by the light pickup 4 using the Kerr effect of the optical flux converged. When the above relation is established in the recording medium 1, the region represented by numeral 27 is an area where the recording is now being carried out, in which a direction of magnetization is along the direction of the magnetic field generated by the floating magnetic head 7. Accordingly, once the magnetization direction in this area is confirmed to be correct according to the information which is currently being recorded, the verification may be effected.

Figure 6:
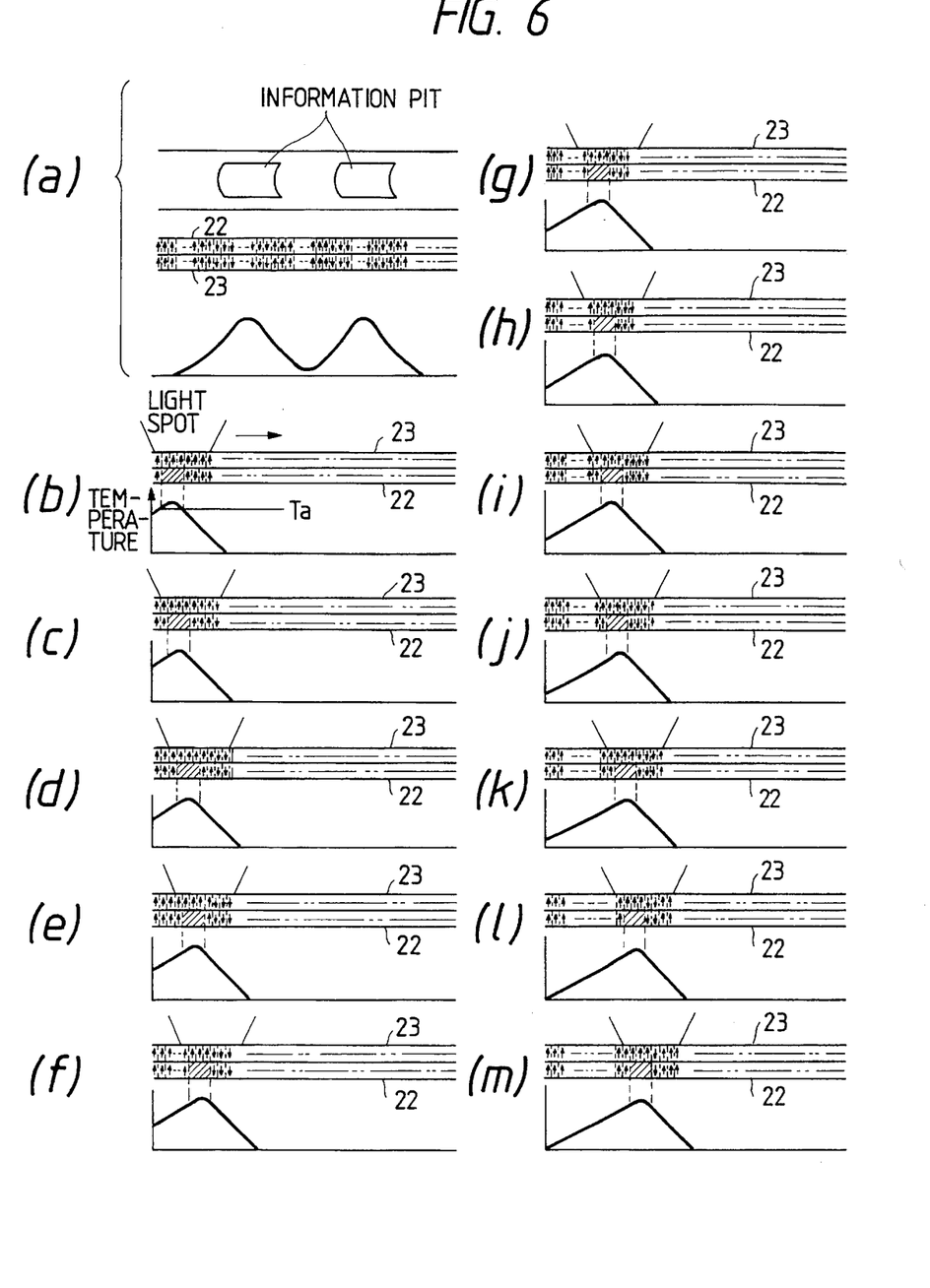

Next, there is explained in detail how the information is recorded with changes in magnetization direction of the first and the second recording layers 22, 23 when the light beam and the magnetic field are indeed applied to the magneto-optical recording medium 1. First shown in (a) in FIG. 6 is a state in which information pits of arrow-feather-like magnetic domain are recorded. The information pits are recorded by the direction of magnetization. The magnetization direction in the first and the second recording layers 22, 23 corresponding to the information pits is downward, and that for other regions is upward. If the information pits thus recorded are reproduced using the Kerr effect, a reproduction signal as shown in the drawing may be obtained. When a light beam for recording is then radiated from the light source as shown in (b) in FIG. 6, a region as shown by oblique lines in the drawing in the first recording layer 22, which exceeds the Curie temperature Ta, is demagnetized. The magnetization of the second recording layer 23 in this region loses the exchange coupling force with the first recording layer 22, whereby is held only by a coercive force of the second recording layer 23 itself. Thus, if an external magnetic field greater than the coercive force of the second recording layer 23 is applied in this state, the magnetization direction of the second recording layer 23 changes to effect the recording of information as desired.

The state of magnetization in (b) in FIG. 6 is one at a time $t_1$ as shown in FIGS. 8A through 8I, which will be explained later. At the time $t_1$, if an upward magnetic field greater than the coercive force of the second recording layer 23 and sufficiently smaller than the coercive force at the first recording layer 22 at an ordinary temperature is applied by the floating magnetic head 7, the area of the second recording layer 23 corresponding to the first recording layer 22 exceeding the Curie temperature has an upward magnetization oriented along the direction of the magnetic field of the floating magnetic head 7. The magnetization of the second recording layer 23 corresponding to the first recording layer 22 not exceeding the Curie temperature is oriented upward by the exchange coupling force with the first recording layer 22. In this case, the second recording layer 23 is not affected by the external magnetic field given by the floating magnetic head 7, and therefore the magnetization direction thereof is determined by the exchange coupling force with the first recording layer 22. The Kerr effect is caused in the optical flux in this state by the magnetization direction of the second recording layer 23 located in the light spot. The RF sensor amplifier 11 detects a direction and a magnitude of the Kerr effect, whereby a direction and a magnitude of magnetization of the second recording layer 23 located in the light spot may be detected and the information may be reproduced. The entire second recording layer 23 in the light spot has the upward magnetization at the time $t_1$. A level of the RF signal reproduced by the RF sensor amplifier 11 is minimized in this state. If the entire second recording layer 23 in the light spot has a downward magnetization, the level of the RF signal becomes maximized.

Figure 7:
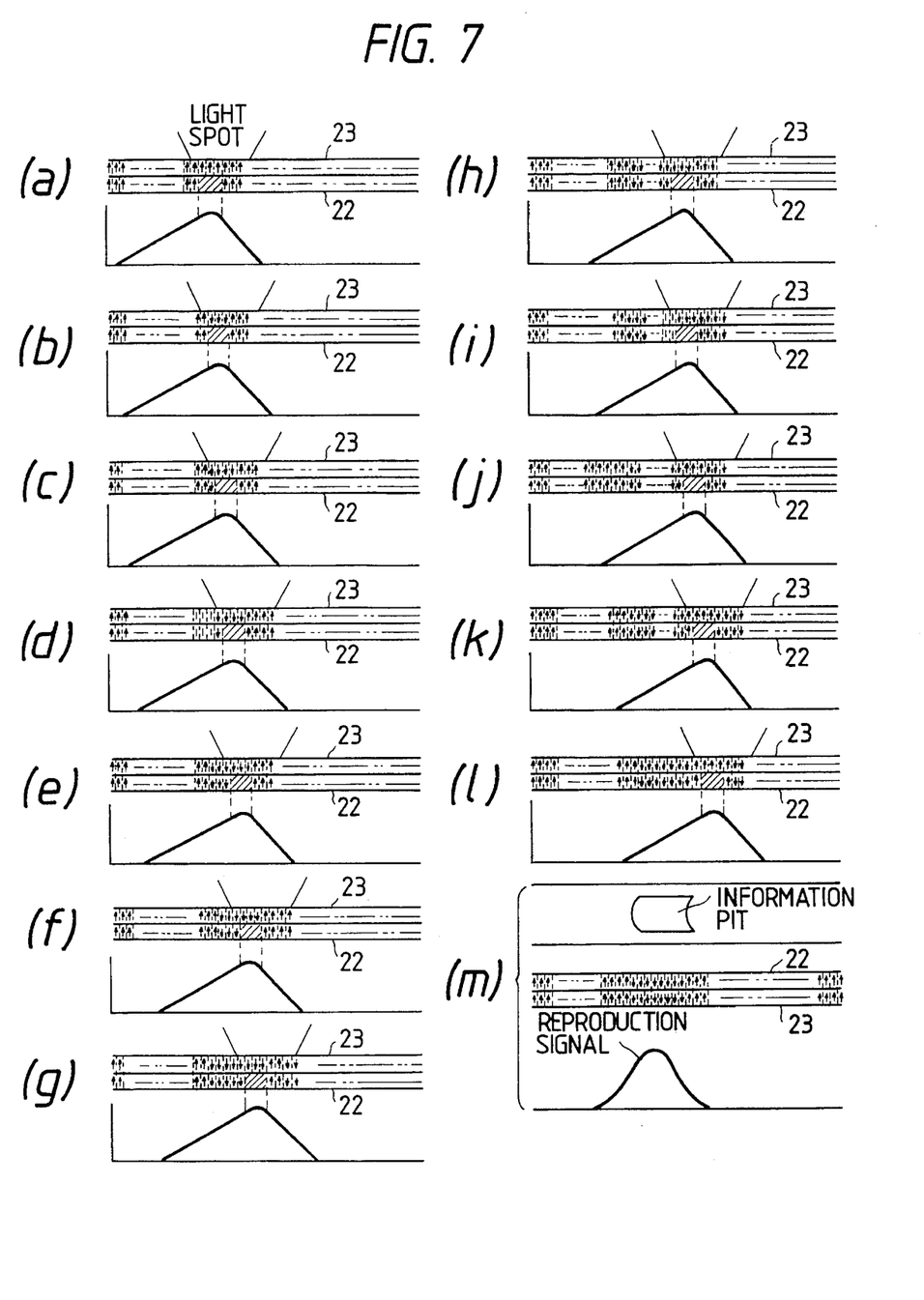

Then at a time $t_2$ as shown in FIG. 8A through 8I after the magneto-optical recording medium 1 is slightly moved, the first and the second recording layers 22, 23 are magnetized in the same process as above as shown in (c) in FIG. 6. In this case, since the downward magnetization, which is old recording information, exists in the second recording layer 23 ahead of the light spot, the level of the RF signal becomes a little larger than that at the time $t_1$. At the time $t_2$, the first recording layer 22 and the second recording layer 23 where the temperatures thereof become lower than the Curie temperature of the first recording layer 22 are magnetized along the direction of the external magnetic field given by the floating magnetic head 7 at the time $t_1$. After that, as shown in (d) to (m) in FIG. 6 and (a) to (l) in FIG. 7, the first and the second recording layers 22, 23 are oriented in a similar process as above in a direction corresponding to an information signal by the mutual action of the light beam and the magnetic field applied, overwriting new information on old information. Then, finally as shown in (m) in FIG. 7, an arrow-feather-like information pit (herein of downward magnetization) is recorded on the information track.

Figure 8A:
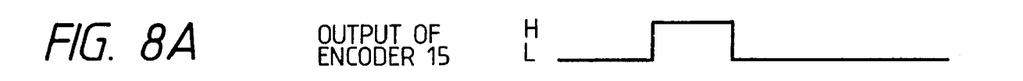
FIGS. 8A to 8I are time charts to show signals in respective sections in the signal processing circuit of FIG. 2.
Figure 8B:
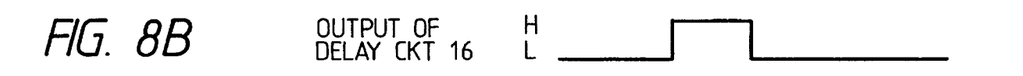
Figure 8C:
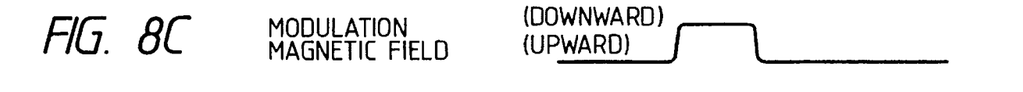
Figure 9A:
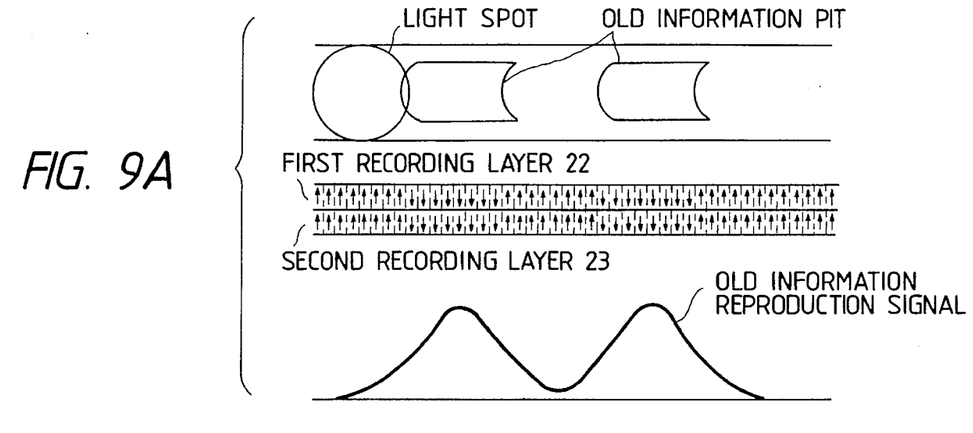
FIGS. 9A and 9B are explanatory drawings to show old information pits on an information track before starting new information recording, a new information pit to be recorded, magnetization directions in the first and the second recording layers corresponding to the respective pits, and reproduction signals therefrom.
Figure 9B:
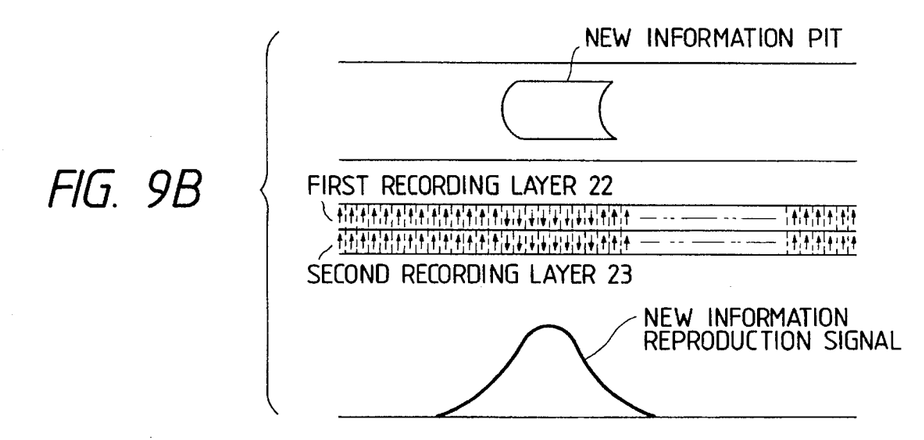

A detailed operation of the present embodiment is next explained with reference to FIGS. 2 and 8A through 8I. In the present embodiment, it is supposed that there remain old information pits previously recorded on the information track of the recording medium as shown in FIG. 9A and that a new information pit as shown in FIG. 9B is recorded over them. FIG. 9A and FIG. 9B show magnetization directions of the first and the second recording layers 22, 23 in correspondence with the respective information pits and reproduction signals reproduced therefrom. FIG. 8A shows a recording signal output from the encoder 15 as shown in FIG. 2 to record the information pit as shown in FIG. 9B. Of course, the recording signal is a signal converted by the the encoder 15 to be suitable for recording. The recording signal is output to the delay circuit 16 and is delayed therein for a predetermined time as shown in FIG. 8B. After the delay, the recording signal is output to the magnetic head driver 8 as shown in FIG. 1. The magnetic head driver 8 drives the floating magnetic head 7 based on the output signal of the delay circuit 16. Thus, the floating magnetic head 7 generates a magnetic field modulated depending upon the recording signal as shown in FIG. 8C to apply it to the recording medium 1. On the other hand, a light beam for recording is radiated from the light source 9 and is converged as a micro light spot as shown in FIG. 9A by the light pickup 4 on the recording medium 1. The light spot is in focusing control and in tracking control performed by the focusing servo 5 and the tracking servo 6 to scan over the information track of the magneto-optical recording medium 1 which is in a rotation state.

Figure 8D:
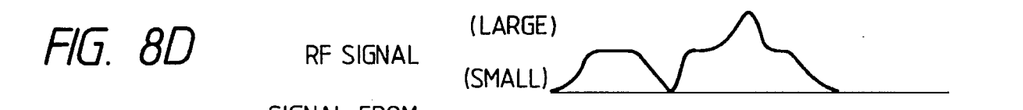
Figure 8E:
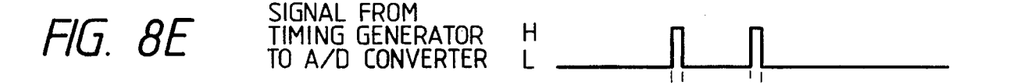
Figure 8F:
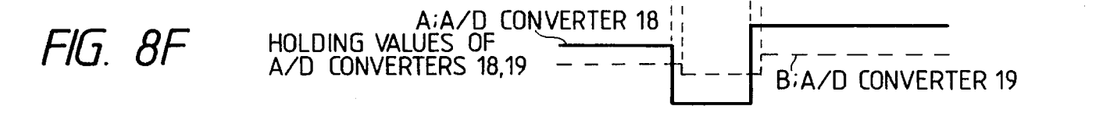

Once the light spot is radiated onto the information track as explained, a reflection light thereof is guided to the RF sensor amplifier 11 and is reproduced as an RF signal as shown in FIG. 8D. Incidentally, the state of magnetization in the recording medium 1 at the time $t_1$ in FIGS. 8A through 8I is the aforementioned one as shown in (b) in FIG. 6. Also, a state at a time $t_{24}$ corresponds to (l) in FIG. 7. Applying a modulated magnetic field as shown in FIG. 8C from the floating magnetic head 7 to a portion where the light beam is radiated, the information recording is carried out by the upward magnetization and the downward magnetization as described above. Meanwhile, the RF signal is taken into the A/D converters 18, 19 with timing signals of the timing generator 17 as shown in FIG. 2, and is held there. The timing signals are output as shown in FIG. 8E before and after the direction of the magnetic field of the floating magnetic head 7 changes, that is, at a leading edge and at a trailing edge of the recording signal as shown in FIG. 8B. The RF signal before the change of the magnetic field is taken into the A/D converter 18, and the RF signal after the change is taken into the A/D converter 19. A time to hold the RF signal is a duration before each A/D converter takes a next RF signal. The RF signal thus held is shown in FIG. 8F, in which a letter A as shown by a solid line is a holding signal of the A/D converter 18 and a character B as shown by a broken line is a holding signal of the A/D converter 19.

Figure 8G:
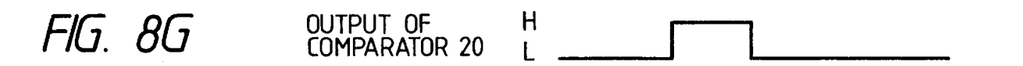
Figure 8H:
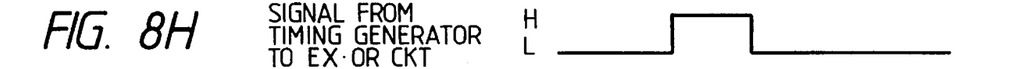

The respective signals held in the A/D converters 18, 19 are output to the next comparator 20, in which levels of the two signals are compared with each other. If a value of the A/D converter 18 is larger than that of the A/D converter 19, the comparator 20 outputs a high level signal as shown in FIG. 8G. Conversely, if the value of the A/D converter 19 is larger than that of the converter 18, a low level signal is output. In other words, the comparator 20 detects in view of a relation between the values of the two A/D converters 18, 19 whether the RF signal is in an increase trend (a state in which the floating magnetic head is applying a downward magnetic field) or in a decrease trend (a state in which the floating magnetic head is applying an upward magnetic field). In the meantime, the timing generator 17 produces a signal representing the direction of the magnetic field of the floating magnetic head 7 as shown in FIG. 8H, that is, a high level signal if the direction of the magnetic field of the floating magnetic head 7 is downward or a low level signal if it is upward, and then outputs it to an exclusive OR circuit 30 (as will be referred to as an Ex. OR circuit). Then, the Ex. OR circuit 30 conducts an exclusive OR operation between the output of the comparator 20 and the signal from the timing generator 17 to detect a match or mismatch of the two input signals. In this case, since the signal as shown in FIG. 8H output from the timing generator 17 to the Ex. OR circuit 30 is one to show which is the direction of the magnetic field generated by the floating magnetic head 7, as described above, detected are the trend of an increase or a decrease of the RF signal reproduced by the RF sensor amplifier 11, and, a match or mismatch of the RF signal with the direction of the magnetic field of the floating magnetic head 7. Accordingly, since the signal level of the RF signal is determined by the magnetization direction of the second recording layer 23 in the light spot, the output signal shows whether the change in magnetic field generated by the floating magnetic head 7 is correctly reflected on the second recording layer 23.

Figure 8I:
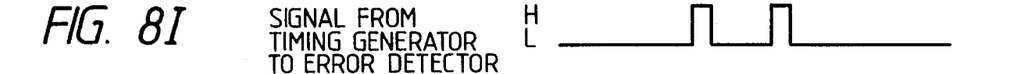

A match or mismatch signal of the Ex. OR circuit 30 thus obtained, that is, an exclusive OR signal between the two signals as shown in FIG. 8G and FIG. 8H, is output down to the error detector 21. The error detector 21 judges using the signal as shown in FIG. 8I whether misredording of information is present or not, and outputs a result thereof to the CPU 14. The error judgement operation of the error detector 21 is explained in more detail. The timing generator 17 outputs the signal as shown in FIG. 8I to the error detector 21 to show that the magnetic field of the floating magnetic head 7 has been inverted and that respective RF signals in the inversion of the magnetic field have been taken into the A/D converters 18, 19, and to show that the respective A/D converters have held the signals. The signal keeps a high level for a certain time as shown in FIG. 8I, and the error dectector 21 takes in the match or mismatch signal of the Ex. OR circuit 30 in the duration of the high level to detect an error based thereon. In the example of FIGS. 8A to 8I, since the direction of the modulated magnetic field is the positive polarity and the RF signal is in an increase trend, high level signals as shown in FIGS. 8G and 8H are respectively input into the Ex. OR circuit 30, whereby the Ex. 0R circuit 30 detects a match. The error detector 21 judges that the information is correctly recorded in this case accordingly. In contrast, if the direction of the modulated magnetic field is not coincident with a trend of an increase or a decrease of the reproduction signal, a mismatch detection signal is output from the Ex. OR circuit 30 to the error detector 21. Then, the error detector 21 judges that the information is not correctly recorded and therefore that an error occurs, and informs the CPU 14 of the judgement result. It is noted that the high level duration of the signal output from the timing generator 17 to the error detector 21 as shown in FIG. 8I is a duration at most extended up to the next inversion of the magnetic field.

In the present embodiment, the simultaneous verification with recording using a single light source, i.e., the one beam direct verification may be effectively performed by detecting a match or mismatch of the direction of the magnetic field generated by the magnetic head with a trend of an increase or a decrease of a level of the RF signal reproduced. In addition, since the verification is not affected by cross talk of old information included in the reproduction signal, accurate verification may be conducted free of influence of old information even if old information components are contained in the reproduction signal as seen in the conventional apparatuses.

Figure 10:
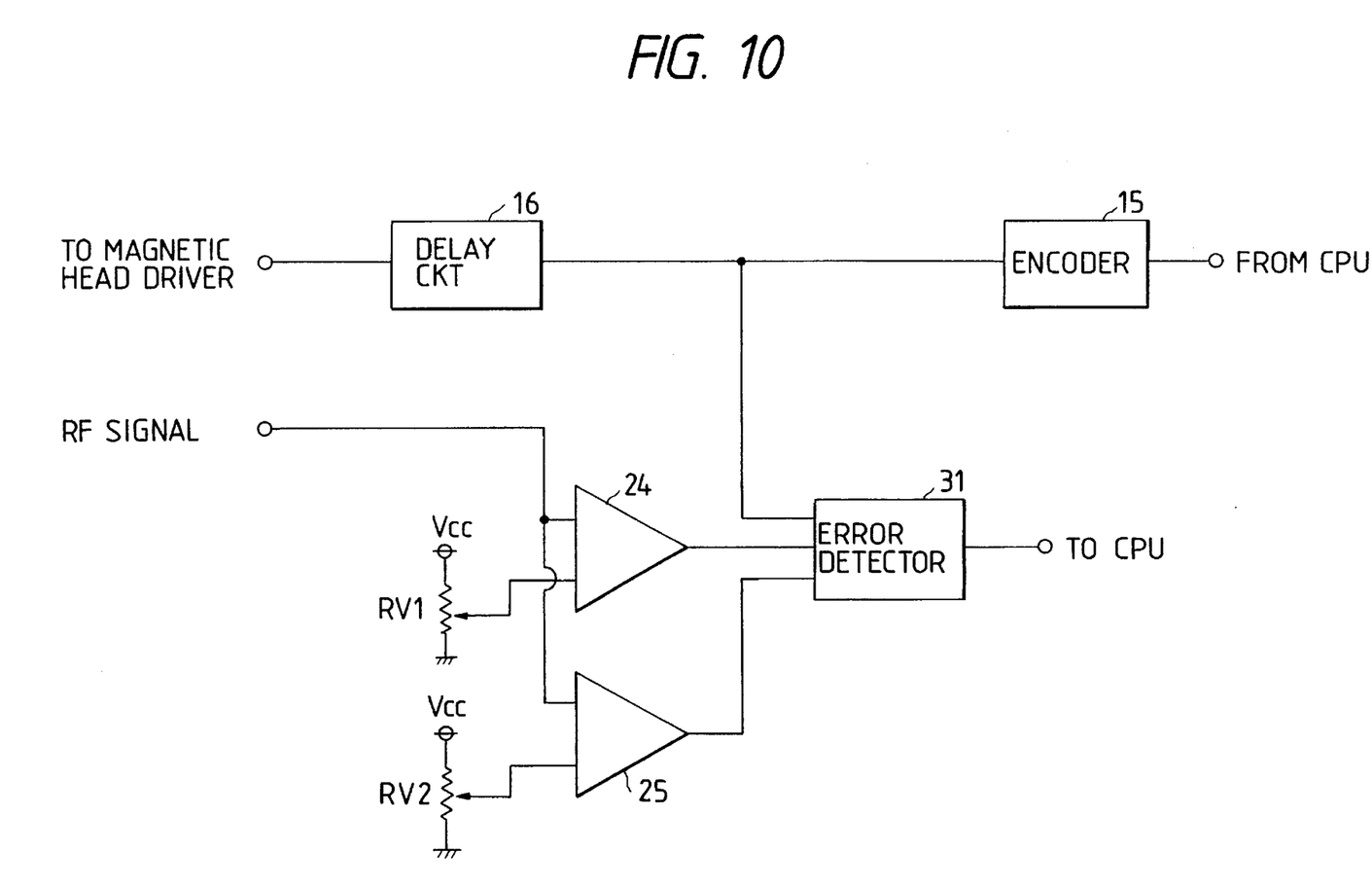
FIG. 10 is a block diagram to show another embodiment of the signal processing circuit to conduct verification.

Another embodiment of the present invention is explained in the following. An error is detected in the above-described embodiment by the match or mismatch of the direction of the magnetic field of the magnetic head with the increase or decrease trend of the reproduction signal, while an error is detected in the present embodiment by a level of the RF signal. Specifically, there exists in the recording layers in the light spot an area which is always influenced by the magnetic field of the magnetic head, and therefore the signal level of the RF signal is always influenced by the area. Thus, the RF signal becomes below a certain value if the magnetic field generated by the magnetic head is, for example, upward, while it becomes above the certain value if the generated magnetic field is downward. The present embodiment effectively employs this fact, in which the verification is carried out without influence of cross talk of old information by monitoring a level of the RF signal. FIG. 10 is a block diagram of the present embodiment, in which reference numeral 15 is an encoder and numeral 16 is a delay circuit, which are the same as shown in FIG. 2. Further, numerals 24, 25 denote comparators which compare a level of the RF signal with respective reference voltages set by variable resistors RV1, RV2. These reference voltages are set at respective constant voltages below and above the certain value, respectively, corresponding to the upward and downward magnetic fields generated as described above. The comparators 24, 25 compare the RF signal with the reference voltages, and output respective comparison results to an error detector 31. In other words, detecting a level of the RF signal thereby to detect a direction of the magnetic field generated by the magnetic head and indeed applied it to the recording medium, the verification is effected by comparing the detection result with the recording signal in the error detector 31. In this case, the error detector judges that the information is correctly recorded if the signal being presently recorded is coincident with the direction of the magnetic field. Otherwise, the detector 31 judges that an error occurs. Then the detector 31 informs the CPU 14 of the judgement result. In the present embodiment, since the verification is carried out by the level of the RF signal, in addition to the advantages of the above first embodiment, another advantage may be enjoyed such that verification may be effective for a long pit in pit edge recording or the like.

Essentials of the above embodiment are listed as follows:
(1) The first recording layer 22 reached the Curie temperature and has no magnetic field.
(2) The second recording layer 23 corresponding to the first recording layer 22 has the same magnetization direction as the direction of the magnetic field of the floating magnetic head.
(3) The RF signal level is determined by the magnetization direction of the second recording layer 23.
(4) There is a region in the light spot where the magnetization direction of the second recording layer 23 is determined by the magnetic field of the floating magnetic head.
(5) The direction of the magnetic field generated by the floating magnetic head is reflected in the RF signal.

(6) The increase or decrease trend of the RF signal is uniquely determined with respect to the direction of change of the magnetic field generated by the floating magnetic head.

(7) In the present embodiment, the first recording layer 22 is recorded with a magnetization of the same direction as that of the second recording layer 23.

(8) By the above, comparing the change direction of the magnetic field generated by the floating magnetic head with the increase or decrease trend of the RF signal, it is identified whether the information is correctly recorded or not, that is, the verification may be conducted.

(9) The signal level of the RF signal is always under influence of the direction of the magnetic field generated by the magnetic head, and it is uniquely determined whether the RF signal level is smaller or larger than the predetermined value according to the magnetization direction of the generated magnetic field. By this, the level of the RF signal shows whether the information is correctly recorded or not, whereby the verification may be conducted.

As described, the present invention may enable the inspection as to whether the recording information is correctly written while carrying out the information recording. The apparatus according to the present invention may enjoy various merits and advantages such as a great progress in increase of recording speed as compared to the conventional apparatuses, simplification of structure of the light head with a single beam spot, easy production of the apparatus without complicated optical adjustment of the light head, etc. In addition, a further advantage is accurate verification effected even in a case of a reproduction signal including old information components, irrespective of cross talk of the old information components.

What is claimed is:

1. A magneto-optical recording apparatus for recording information in a magneto-optical recording medium with a light beam and an external magnetic field, said apparatus comprising:

means for radiating the light beam to the recording medium;

magnetic field applying means for applying the external magnetic field modulated in accordance with recording information to a portion thus radiated by the light beam to record the information on the recording medium;

means for reproducing the information recorded in the recording medium by detecting reflection light of the light beam from the medium, and outputting a reproduction signal;

detecting means for detecting whether a level of the reproduction signal is in an increase trend or in a decrease trend; and means for judging whether the information is correctly recorded based on a detection result of said detecting means and a direction of the magnetic field applied by said magnetic field applying means, while recording the information.

2. A magneto-optical recording apparatus according to claim 1, wherein the recording medium has at least a first magnetic layer and a second magnetic layer exchange-coupled with the first magnetic layer and having a higher Curie temperature and a lower coercive force than those of the first magnetic layer.

3. A magneto-optical recording apparatus according to claim 1, wherein said detecting means detects whether a level of the reproduction signal is in an increase trend or in a decrease trend in accordance with level changes of the reproduction signal immediately before said magnetic field applying means applies the magnetic field to the recording medium and of the reproduction signal immediately after said magnetic field applying means applies the magnetic field.

4. A magneto-optical recording apparatus for recording information in a magneto-optical recording medium with a light beam and an external magnetic field, said apparatus comprising:

means for radiating the light beam to the recording medium;

magnetic field applying means for applying the external magnetic field modulated in accordance with recording information to a portion thus radiated by the light beam to record the information on the recording medium;

means for reproducing the information recorded in the recording medium by detecting reflection light of the light beam from the medium, and outputting a reproduction signal;

comparing means for comparing a level of the reproduction signal with a first reference value and with a second reference value; and means for judging whether the information is correctly recorded based on a comparison result of said comparing means and the recording information, while recording the information.

5. A magneto-optical recording apparatus according to claim 4, wherein the recording medium has at least a first magnetic layer and a second magnetic layer exchange-coupled with the first magnetic layer and having a higher Curie temperature and a lower coercive force than those of the first magnetic layer.

6. A magneto-optical recording apparatus according to claim 4, wherein said comparing means outputs a comparison result that a direction of the magnetic field applied by said magnetic field applying means is in a first direction if a level of the reproduction signal is lower than the first reference value, but outputs a comparison result that the direction of the magnetic field applied by said magnetic field applying means is in a direction opposite to the first direction if a level of the reproduction signal is higher than the second reference value.

* * * * *

UNITED STATES PATENT AND TRADEMARK OFFICE
CERTIFICATE OF CORRECTION

PATENT NO. : 5,563,851
DATED : October 8, 1996
INVENTOR(S) : KATUYA YAMAZAKI

It is certified that error appears in the above-indentified patent and that said Letters Patent is hereby corrected as shown below:

COLUMN 2
    Line 53, "Figs." should read --Fig--.
    Line 53, "is" should read --are-- and "drawing" should read --drawings--.
    Line 55, "is" should read --are-- and "drawing" should read --drawings--.

COLUMN 3
    Line 26, "tile" should read --the--.

COLUMN 4
    Line 27, "embodiment:" should read --embodiment.--

COLUMN 5
    Line 48, "FIG. 8A" should read --FIGS. 8A--.

COLUMN 7
    Line 32, "misredording" should read --misrecording--.

Signed and Sealed this

Sixth Day of May, 1997

Attest:

BRUCE LEHMAN

*Attesting Officer*        *Commissioner of Patents and Trademarks*